(12) United States Patent
von Tardy-Tuch

(10) Patent No.: US 10,343,262 B2
(45) Date of Patent: Jul. 9, 2019

(54) TOOL FOR AN IMPACT WRENCH FOR SECURING A VEHICLE WHEEL

(71) Applicant: Dr. Ing. h.c. F. Porsche Aktiengesellschaft, Stuttgart (DE)

(72) Inventor: Georg von Tardy-Tuch, Unterreichenbach-Kapfenhardt (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 210 days.

(21) Appl. No.: 15/499,088

(22) Filed: Apr. 27, 2017

(65) Prior Publication Data

US 2017/0312892 A1    Nov. 2, 2017

(30) Foreign Application Priority Data

Apr. 28, 2016   (DE) .................. 10 2016 107 914

(51) Int. Cl.
*B23B 13/06*   (2006.01)
*B25B 21/02*   (2006.01)
(Continued)

(52) U.S. Cl.
CPC ............ *B25B 13/065* (2013.01); *B25B 21/02* (2013.01); *B25B 23/10* (2013.01); *B60B 3/142* (2013.01);
(Continued)

(58) Field of Classification Search
CPC ..... B25B 13/065; B25B 23/10; B60B 29/003; B60B 29/006; B60B 3/142; B60B 3/145
(Continued)

(56) References Cited

U.S. PATENT DOCUMENTS 8,646,364 B2 *   2/2014   Kang ...................... B25B 13/48
                                                                81/119
9,978,190 B2 *   5/2018   Lopes ...................... B60B 3/16

FOREIGN PATENT DOCUMENTS

DE         10106140 A1      8/2002
DE         20303978 U1      5/2003
(Continued)

OTHER PUBLICATIONS

German Search Report, dated Jan. 12, 2017, with partial English translation, 7 pages.

(Continued)

*Primary Examiner* — Hadi Shakeri
(74) *Attorney, Agent, or Firm* — RatnerPrestia

(57) ABSTRACT

A screwing tool for an impact wrench for screwing wheel nuts onto and off from a hub body for securing a vehicle wheel, having a main body, which has an open side oriented toward the wheel nuts and which includes a hollow profile. The hollow profile has a tool contour, which is arranged on the open side and can be brought into engagement with a wheel nut contour. At least one peripheral control edge is remote from the open side for releasing a retention element. The control edge has a circular arc region with a constant control edge height $h_1$ and a cam region with a control edge height $h_2$ that decreases continuously and then increases again continuously. Height $h_1$ is equal to $h_2$ in the respective transition of the circular arc region and the cam region, such that the geometrical shape of an oval is reproduced in cross section.

6 Claims, 3 Drawing Sheets

(51) Int. Cl.
*B25B 23/10* (2006.01)
*B60B 29/00* (2006.01)
*B60B 3/14* (2006.01)
*B60B 3/16* (2006.01)
*B25B 13/06* (2006.01)

(52) U.S. Cl.
CPC ............ *B60B 3/165* (2013.01); *B60B 29/003* (2013.01); *B60B 29/006* (2013.01)

(58) Field of Classification Search
USPC .......................................................... 81/464
See application file for complete search history.

(56) References Cited

FOREIGN PATENT DOCUMENTS

| | | |
|---|---|---|
| DE | 10207815 A1 | 9/2003 |
| DE | 102011112152 A1 | 3/2013 |
| DE | 102012107543 A1 | 2/2014 |
| DE | 102013002443 A1 | 8/2014 |

OTHER PUBLICATIONS

Great Britain Combined Search and Examination Report for Great Britain Application No. GB1706628.3, dated Sep. 20, 2017, 4 pages.

\* cited by examiner

US 10,343,262 B2

TOOL FOR AN IMPACT WRENCH FOR SECURING A VEHICLE WHEEL

CROSS-REFERENCE TO RELATED APPLICATION

This application claims priority to German Patent Application No. 102016107914.6, filed Apr. 28, 2016, the content of such application being incorporated by reference herein in its entirety.

FIELD OF THE INVENTION

The invention relates to a screwing tool for an impact wrench for screwing wheel nuts onto and off from a hub body for securing a vehicle wheel, especially in motorsport, having a main body, which has an open side oriented toward the wheel nut and which includes a hollow profile, wherein the hollow profile has a tool contour, which is arranged on the open side and can be brought into engagement with a wheel nut contour of matching design, and has at least one peripheral control edge remote from the open side for releasing a retention element. The invention furthermore relates to an impact wrench having a screwing tool of this kind.

BACKGROUND OF THE INVENTION

Particularly in motor racing, vehicle wheels are secured on the respective axle by means of a central wheel nut, which is screwed onto the vehicle hub. In order to prevent unwanted release of this single wheel nut and hence release of the entire vehicle wheel, retention devices have to be provided to additionally secure the central wheel nut. A wheel retention system of this kind, which furthermore also discloses a radial retention of the retention element used, is known from DE 102 07 815 B4, which is incorporated by reference herein. Here, the retention device consists of two retention elements offset by 180°, which are spring-loaded and which move out of the hub body after the wheel nut is screwed on and consequently secure the wheel nuts against twisting. The retention elements have a surface which rises toward the wheel nut and via which the retention elements can be pressed inward again to release the wheel nut in order to allow the necessary axial movement of the wheel nut. Just like the wheel, however, these retention elements are exposed to high loads, in particular due to operating loads, with the result that these retention elements can jam in the hub body. Such jamming sometimes makes it impossible to release the wheel nuts automatically by means of an impact wrench. The retention elements must then be released mechanically by hand with a high expenditure of force to enable the impact wrench subsequently to be used. This manual mechanical release is associated with a large expenditure of time, which is unwanted and disadvantageous especially in motorsport.

It would be desirable to avoid the abovementioned disadvantage in a simple and low-cost way.

SUMMARY OF THE INVENTION

The control edge has at least one circular arc region with a constant control edge height $h_1$ and at least one cam region with a control edge height $h_2$ that decreases continuously and then increases again continuously, wherein $h_1$ is equal to $h_2$ in the respective transition of the circular arc region and of the cam region, such that the geometrical shape of an oval is reproduced in cross section. In contrast to a rectilinear control edge known from the prior art, it is thereby possible to generate force vectors of the screwing tool which act in the radial direction of the retention element and in this way release the jamming of the retention element in order subsequently to enable the engagement of the tool with the wheel nut to be released.

In an advantageous embodiment, the control edge reproduces a symmetrical oval in cross section, wherein two circular arc regions arranged symmetrically with respect to one another and two cam regions arranged symmetrically with respect to one another are provided. A minimum control edge height can be $h_{2min}=0$.

In an advantageous way, the control edge is adjoined in the direction of the hollow profile by a phase region with a subsequent round profile. This ensures that, with the retention elements pressed in, the screwing tool engages around the wheel nut in a known manner.

The object is likewise achieved by an impact wrench for screwing wheel nuts on and off, especially in motorsport, having a housing, in which a rotor that can be driven by a driving device and an impact mechanism that can be driven by said rotor are arranged, wherein the impact mechanism has an output shaft, which projects from the housing and the end of which remote from the impact mechanism has a screwing tool according to the invention. It has proven particularly advantageous if the driving device is a compressed air device.

BRIEF DESCRIPTION OF THE DRAWING FIGURES

The invention is explained in greater detail by means of a drawing, in which:

FIG. 1b shows a sectioned view along section 1b-1b in FIG. 1a,

FIG. 1c shows a sectioned view along the section 1c-1c in FIG. 1a,

DETAILED DESCRIPTION OF THE INVENTION

Figure 1A:
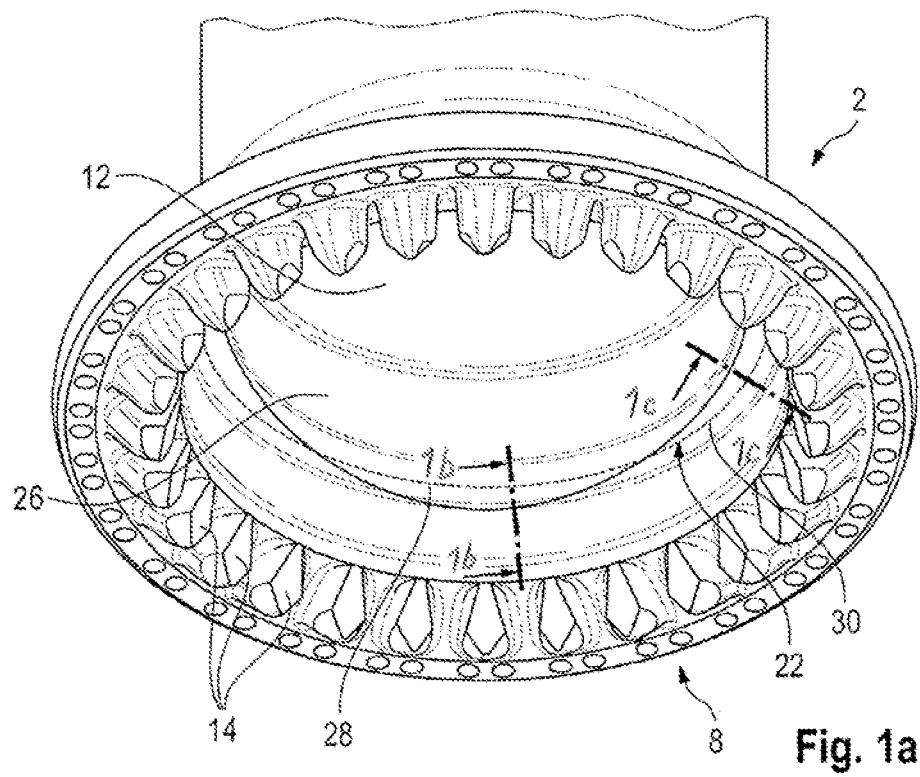
FIG. 1a shows a perspective view of a screwing tool according to the invention.
Figure 3:
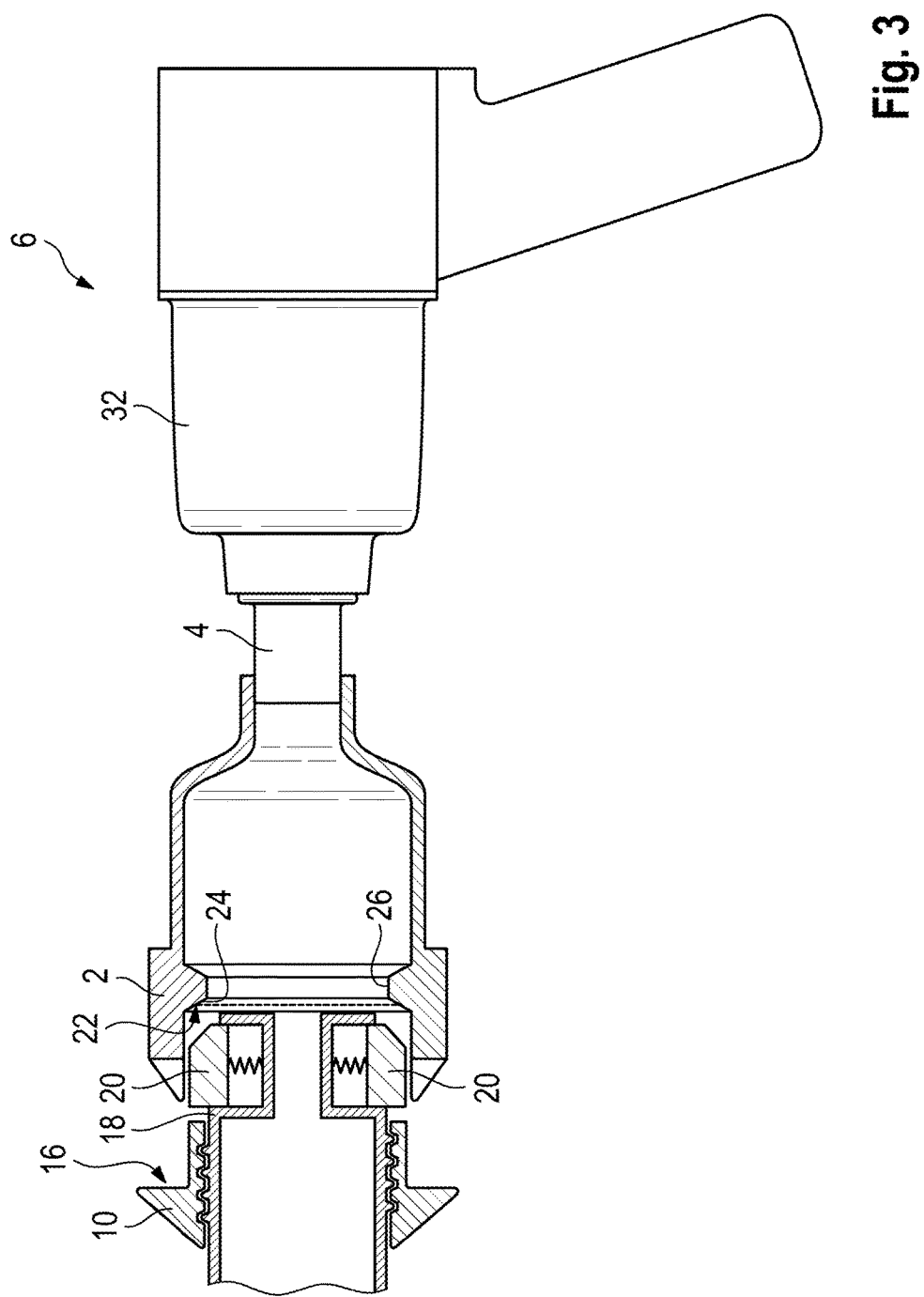
FIG. 3 shows a schematic sectioned view of the screwing tool illustrated in FIGS. 1a-1c just before engagement with a wheel nut.

FIG. 1a shows a perspective view of a screwing tool 2, which is coupled in a known manner, as illustrated in FIG. 3, to an output shaft 4 of an impact wrench 6. Here, the screwing tool 2 has a main body 8, which has an open side oriented toward a wheel nut 10 and which includes a hollow profile 12, which, on the open side, has a tool contour 14 that can be brought into engagement with a wheel nut contour 16 of matching design. Screwing tools 2 of this kind are used for screwing the central wheel nuts 10 onto and off from a hub body 18, especially in motorsport. In order to prevent unintentional release of the single wheel nut 10 and, as a result, release of a vehicle wheel (not shown specifically), retention elements 20 are provided (as illustrated in FIG. 3), and, in a known manner, these prevent axial movement of the wheel nut 10 away from the vehicle. In the illustrative embodiment under consideration, two retention elements 20 offset by 180° are provided. In order to allow automated pressing in of the retention elements 20 when the screwing tool 2 is applied and hence to allow release of the wheel nut 10 from the hub body 18, a control edge 22 is provided.

Figure 1B:
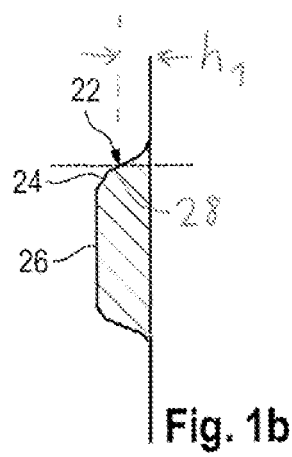
Figure 1C:
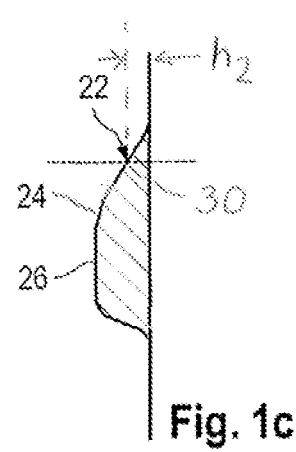

The control edge 22 is adjoined by a phase region 24 which reproduces a transition from the control edge 22 to a round profile 26 which, in the retracted state of the retention elements, engages around the wheel nut 10 in a known manner. FIGS. 1b and 1c show the design of the phase region 24 in accordance with sections 1b-1b and 1c-1c in FIG. 1a, respectively. It should be clear that the design of the phase region 24 can be varied and depends substantially on the design of the control edge 22. Moreover, the phase region 24 can have a depth that varies along its length in order to provide further variation in the impact direction of the impact wrench 6.

Figure 2:
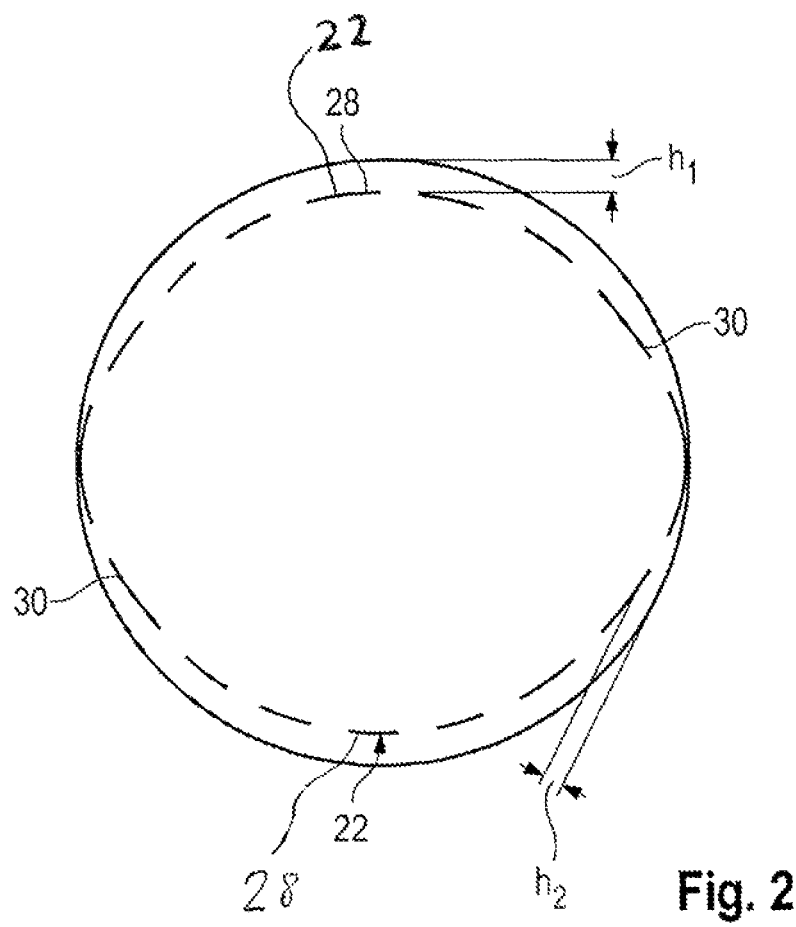
FIG. 2 shows a sectioned view of the screwing tool according to FIGS. 1a-1c in the region of the control edge.

FIG. 2 shows a cross-sectional view of the screwing tool 2 from FIG. 1a in the region of the control edge 22. In order to be able to release even jammed retention elements 20, it is envisaged according to the invention that the control edge 22 has at least one circular arc region 28 with a constant control edge height $h_1$ and at least one cam region 30 with a control edge height $h_2$ that decreases continuously and then increases again continuously. In the respective transition of the circular arc region and of the cam region, $h_1=h_2$. Thus, the cross section represents the geometrical shape of an oval. In the illustrative embodiment under consideration, the control edge is represented as a symmetrical oval in cross section, wherein two circular arc regions 28 arranged symmetrically with respect to one another and two cam regions 30 arranged symmetrically with respect to one another are provided. In the illustrative embodiment shown, the minimum control edge height $h_{2min}$ is equal to 0.

FIG. 3 then shows, in cross section, an air-operated impact wrench 6 known per se for screwing wheel nuts 10 on and off. This impact wrench has a housing 32, in which an impact mechanism (not shown specifically) is driven by a driving device via a rotor, wherein, in the illustrative embodiment under consideration, the driving device is embodied as a compressed air device. As is usual in motorsport, these wheel nuts 10 are provided centrally on the hub body 18 in order to secure a vehicle wheel (not shown). In order to ensure rapid release of the wheel nuts 10, it is necessary to be able to press in the retention elements 20 in an automated manner, even when there is jamming. By virtue of the design according to the invention of the screwing tool 2, the impact motion of the impact wrench 6 acting in the direction of rotation is used to enable jammed retention elements 20 to be released. Automated release of the wheel nuts 10 thus takes place in a single operation.

What is claimed is:

1. A screwing tool for an impact wrench for screwing wheel nuts onto and off from a hub body for securing a vehicle wheel, said screwing tool comprising:
    a main body, which has an open side oriented toward the wheel nut and which includes a hollow profile, wherein the hollow profile has a tool contour, which is arranged on the open side and is configured to be brought into engagement with a wheel nut contour of matching design, and
    at least one peripheral control edge remote from the open side for releasing a retention element,
    wherein the control edge has (i) at least one circular arc region with a constant control edge height $h_1$ and (ii) at least one cam region with a control edge height $h_2$ that decreases continuously and then increases again continuously,
    wherein $h_1$ is equal to $h_2$ in a respective transition of the circular arc region and the cam region, such that the geometrical shape of an oval is reproduced in cross section.

2. The screwing tool as claimed in claim 1, wherein the control edge reproduces a symmetrical oval in cross section, and includes two circular arc regions arranged symmetrically with respect to one another and two cam regions arranged symmetrically with respect to one another.

3. The screwing tool as claimed in claim 1, wherein a minimum control edge height $h_{2min}=0$.

4. The screwing tool as claimed in claim 1, wherein the control edge is adjoined in a direction of the hollow profile by a phase region with a subsequent round profile.

5. An impact wrench for screwing wheel nuts on and off, the impact wrench having a housing, in which a rotor that is configured to be driven by a driving device and an impact mechanism that is configured to be driven by said rotor are arranged, wherein the impact mechanism has an output shaft, which projects from the housing and the end of the output shaft that is remote from the impact mechanism has a screwing tool as claimed in claim 1.

6. The impact wrench as claimed in claim 5, wherein the driving device is a compressed air device.

* * * * *